April 27, 1965 R. L. MORISSON 3,180,574
STAMPING MACHINE
Filed July 3, 1959 10 Sheets-Sheet 3

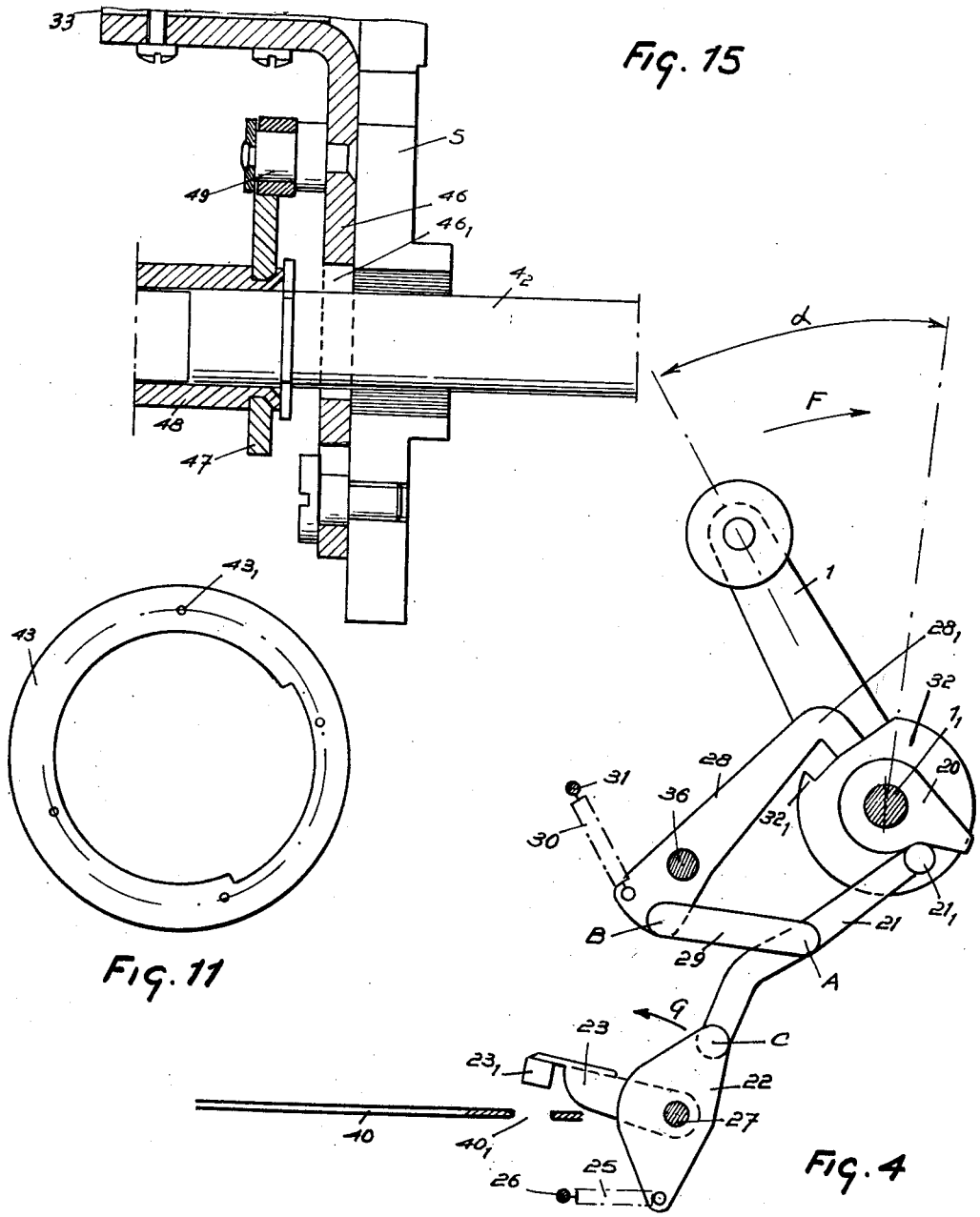

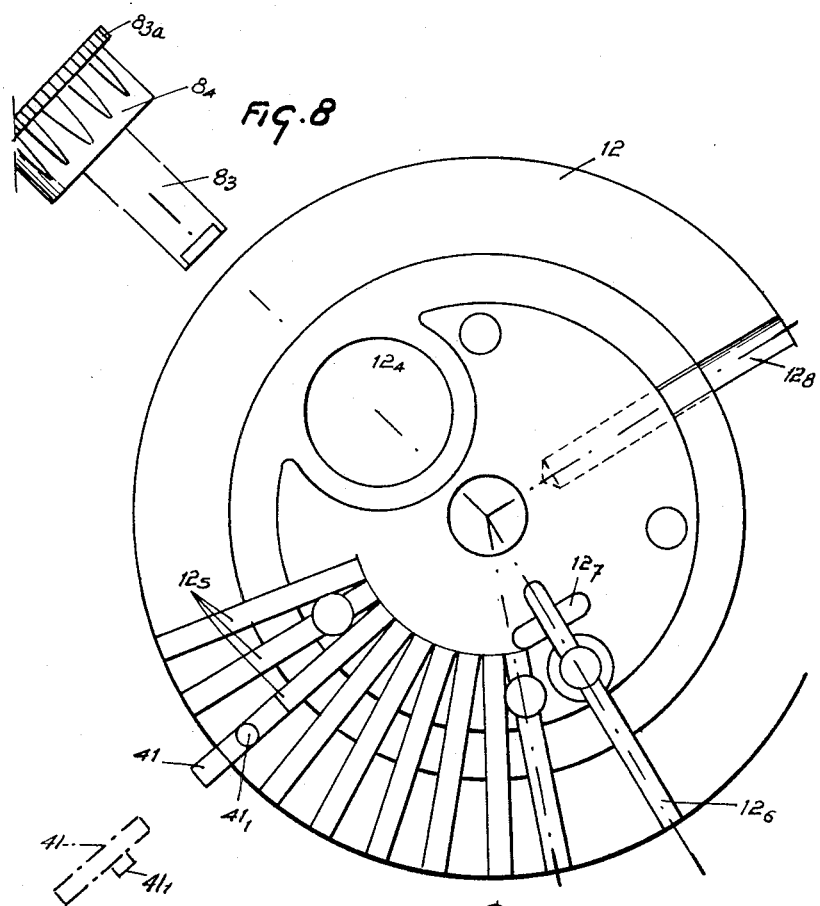
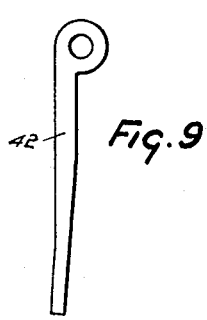
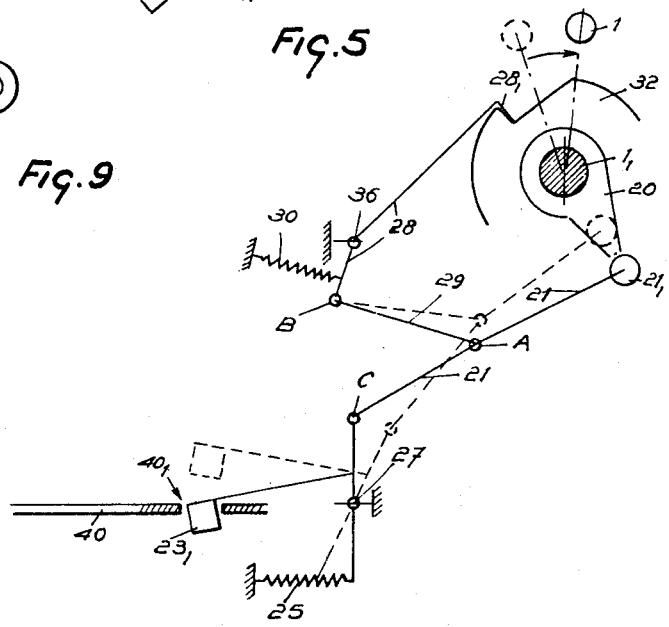

April 27, 1965     R. L. MORISSON     3,180,574
STAMPING MACHINE

Filed July 3, 1959                    10 Sheets-Sheet 6

April 27, 1965  R. L. MORISSON  3,180,574
STAMPING MACHINE
Filed July 3, 1959  10 Sheets-Sheet 7

April 27, 1965 R. L. MORISSON 3,180,574
STAMPING MACHINE
Filed July 3, 1959 10 Sheets-Sheet 9

April 27, 1965   R. L. MORISSON   3,180,574
STAMPING MACHINE
Filed July 3, 1959   10 Sheets-Sheet 10
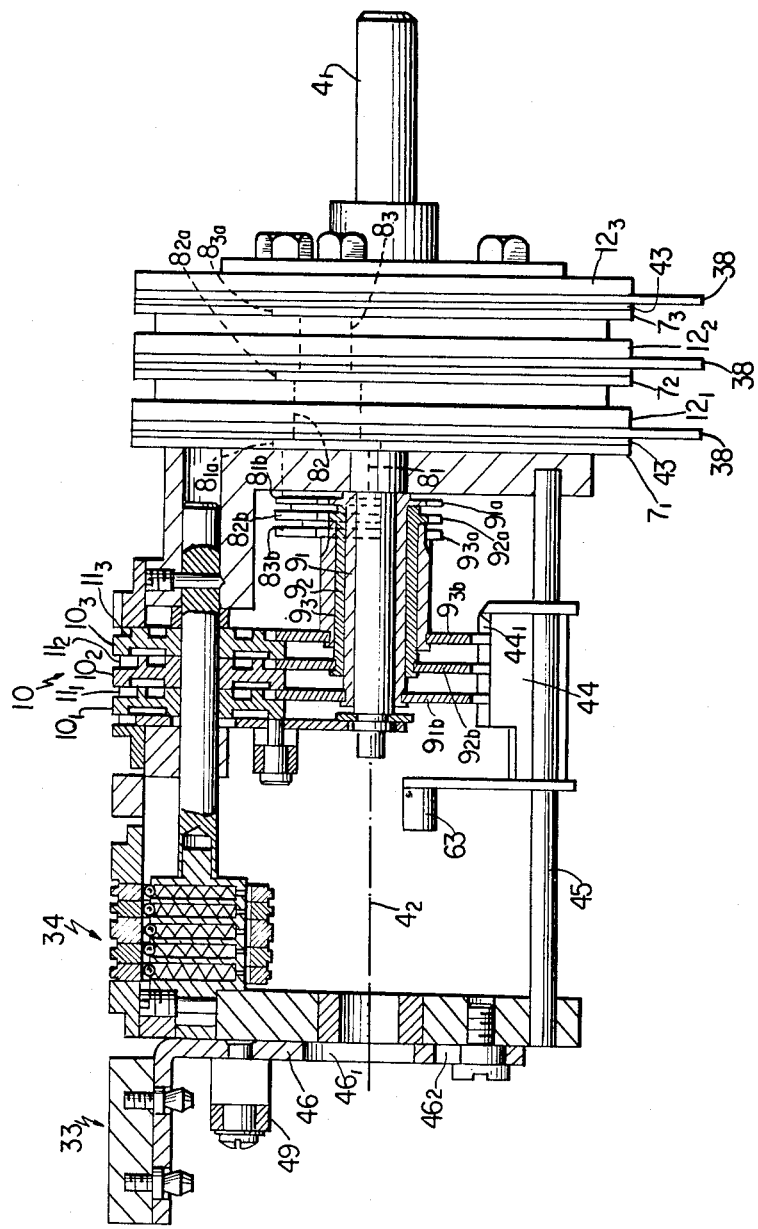
INVENTOR
ROGER LOUIS MORISSON

United States Patent Office 3,180,574
Patented Apr. 27, 1965

3,180,574
STAMPING MACHINE
Roger Louis Morisson, Bondy, France, assignor to Societe pour l'Affranchissement et le Timbrage Automatiques S.A.T.A.S., Paris, France
Filed July 3, 1959, Ser. No. 827,986
Claims priority, application France, Sept. 25, 1958, 775,303
9 Claims. (Cl. 235—101)

The invention applies in particular to machines for stamping letters, covers, postal packages, etc., as well as to machines for stamping commercial documents, receipts, waybills, guarantee certificates, documents called "stamped" and in general all public or private documents recording the payment of a public or private tax with an accountancy and addition of the amount of said taxes under the best conditions of speed and security.

This machine gives the user more particularly the absolute certainty of the concordance of the value selected with the position of the corresponding embossed printing roller.

The stamping machine described and shown in the following specification affords the following advantages:

(a) Positive operative connection of the embossed printing rollers with the selection devices, (b) Carrying forward on to the totalization device of the selected values before printing said values on a document, (c) Locking the machine if no document is introduced on to its plate.

The invention also applies to the characteristics hereinafter described and to their various possible combinations.

A stamping machine according to the invention is shown by way of non-restrictive examples in the attached drawings, in which:

FIGURE 4 is a diagrammatical view of the locking device of the crank ensuring the drive of the rotary head of the machine;

FIGURE 5 is a diagrammatical view of the locking device of FIGURE 4, the linkage system being shown in the position occupied when no document has been introduced into the machine;

FIGURE 7 is a sectional view taken generally along radial lines in FIGURE 8;

FIGURE 8 is a front view of a plate shown edgewise in FIGURE 7;

FIGURE 9 is a front view of a carrying-forward tooth shown edgewise in FIGURE 7;

FIGURE 11 is a front view of the ring shown edgewise in FIGURE 7;

FIGURE 15 is a side view of the mounting of the publicity unit on the rotary head of the machine;

FIGURE 19 is a longitudinal sectional view of the rotary head of the machine, with some parts shown diagrammatically.

Figure 1:
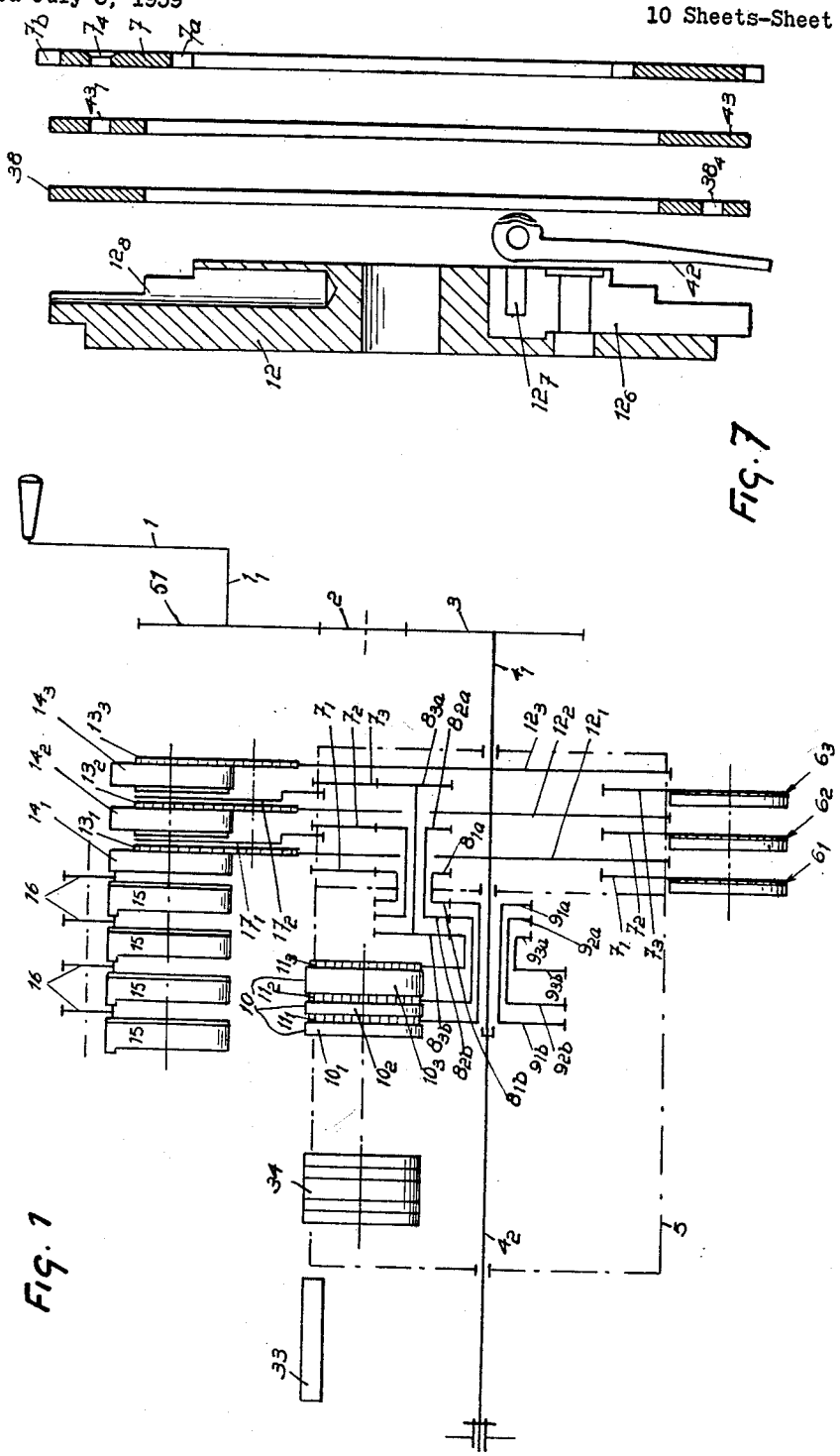
FIGURE 1 is a general diagram of the machine showing the relations between the devices for selecting values and the embossed printing rollers, and between the embossed printing rollers and the totalization devices.

As shown in FIGURE 1, the stamping machine comprises essentially a rotary head 5, driven by a spindle $4_1$ carrying a pinion 3 at one end which cooperates with an intermediate pinion 2 driven by the pinion $5_1$ of a hand crank 1.

The rotary head 5 (see FIGURE 19) which is shown in dash and dotted lines in FIGURE 1, comprises the valve selection devices 38, $12_1$, $12_2$, $12_3$, $7_1$, $7_2$, and $7_3$, the gear trains $8_1$, $8_2$, $8_3$, $9_1$, $9_2$, $9_3$ which transmit the values, the printing rollers 10–33–34 and the locking device 44 for preventing a modification of the printing value during the rotation of the rotary head 5. The assembly of these devices forming the rotary head 5 revolves around the spindle 4, during the printing of a document. As shown in FIGURE 1, there are positioned outside of this rotary head 5 and located parallel to its axis totalizing rollers $14_1$, $14_2$, $14_3$ and 15, as well as the position finder wheels $6_1$, $6_2$ and $6_3$. These totalization rollers and position finder wheels are in constant mechanical engagement with the rotary head, as will be more fully described in the rest of the description.

The stamping machine is provided with a locking device, enabling the rotation of the rotary head 5 to occur by operation of the hand crank 1, provided there is a document placed on the plate 40 of the machine, in the utilization position. The hand crank 1 is turned once to revolve the rotary head 5 one revolution, and during this operation the document is stamped and ejected from the machine. Then the hand crank is automatically locked against further rotation until another document is placed on the plate or tray 40 of the machine.

Figure 6:
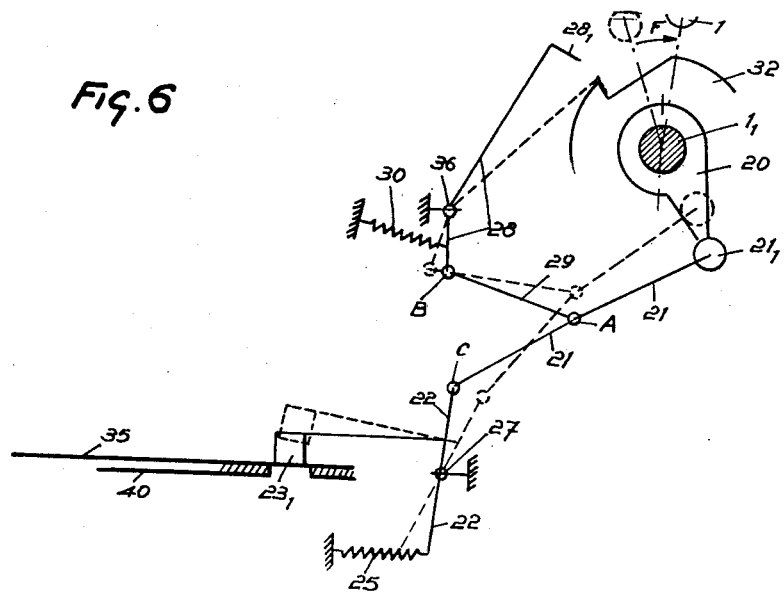
FIGURE 6 is a diagrammatical view similar to that of FIGURE 5, the linkage system being shown in the position occupied when a document is introduced on the plate of the stamping machine.

The locking device is more particularly shown in FIGURES 4 to 6. It essentially comprises a feeler 23 whose head $23_1$ can engage in a slot $40_1$ in the plate 40.

This feeler 23 is connected by a linkage system 22, 21, 29 to a stop lever 28 cooperating with a cam 32 integral with the rotatable shaft $1_1$ of the hand crank 1.

The linkage system assembly 29, 21, 22 is pivotally mounted at two fixed points 36 and 27 and its displacements are controlled by two springs 30 and 25 mounted on fixed points 26 and 31.

On the other hand, the cam 32 integral with the spindle $1_1$ of the crank 1 has a cut-away part $32_1$ on to which the end $28_1$ of the stop lever 28 bears; thus, when the lever 1 moves throguh the angle α (FIGURE 4) the cam 32 driven by the displacement of the crank 1 moves until its spur $32_1$ abuts against the end $28_1$ of the lever 28 which stops the rotation of the cam 32.

When a document 35 (FIGURE 6) is introduced on the plate 40 of the stamping machine and the user turns the crank 1 in the direction of the arrow "F," a cam 20 integral with the spindle $1_1$ of the crank moves the end $21_1$ of a lever 21 pivoted at C on a small plate 22 connected to the feeler 23.

The end $23_1$ of the feeler 23 then abuts on the document 35, such as a letter placed on the plate 40, with the result that said feeler 23 becomes a fixed point, and as the roller $21_1$ continues its movement under the effect of the cam 20, the small connecting link 29 shifts the lever 28, which, by pivoting around its axle 36, releases its hooked end $28_1$ from the recess $32_1$ in the cam 32.

Under the action of the crank 1, the shaft $1_1$ integral with the cam 32 will thus turn beyond the angle $\alpha$, and as a result of this, rotary movement, the shaft $1_1$ will act through the pinions 2 and 3 to cause the rotation of the rotary head 5.

Thus, the locking device only permits the rotation of the rotary head 5 when a document is placed on the tray 40 of the stamping machine and stops the initial displacement of the feeler 23 during the displacement $\alpha$ of the crank 1.

This position finder 6 shows the value corresponding to the position of each selection lever 38.

Figure 12:
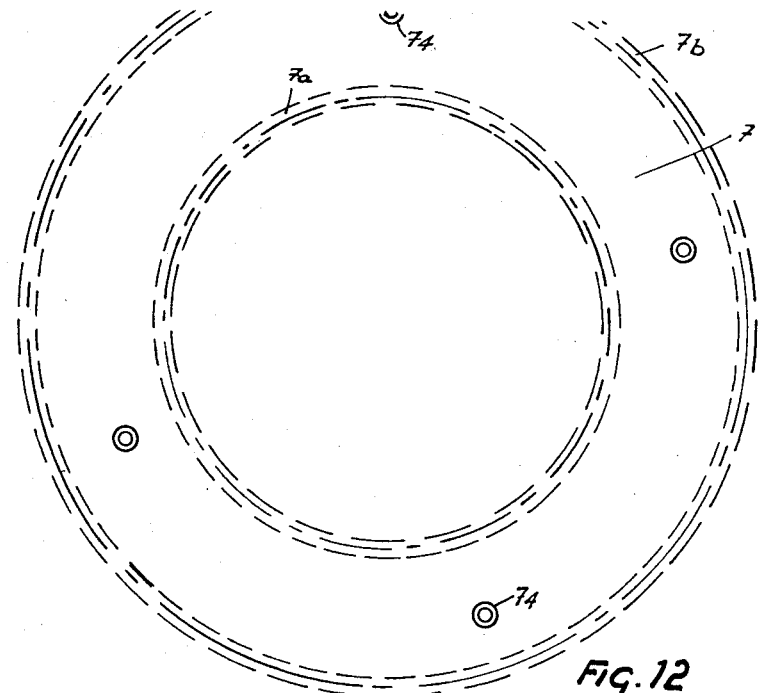
FIGURE 12 is a front view of the double-toothed disk shown edgewise in FIGURE 7.

The selection of the values that the user wishes to print on the document 35 by means of the embossed printing rollers 10 is effected in the known manner by a plurality of Ohdner disks $12_1$, $12_2$ and $12_3$, each of which is secured to the shaft 4 for rotation therewith. As shown in FIGURES 7 and 8, each of the Ohdner disks essentially comprise a plate 12 and a disk lever 38 (FIGURE 10) for selecting values. To each of these lever disks 38, a disk 7 (FIGURE 12) is attached preferably comprising double teeth, shown as internal and external gear teeth.

The plate 12 of the Ohdner disk, as shown more especially in FIGURE 8, comprises radial grooves $12_5$ in which teeth 41 can move, whose heads $41_1$ engage in a groove $38_4$ (FIGURE 10) of the value selection lever 38.

On the other hand, the plate 12 comprises a radial groove $12_6$ in which engages a carrying-forward tooth 42 (FIGURE 9), whose carrying-forward operation will be referred to farther on.

Lastly, the plate 12 also comprises a longitudinal bore $12_4$, acting as a housing for the head $8_4$ of a pinion 8 said pinion providing a positive operative connection between the value selecting device and the embossed printing rollers 10.

Figure 3:
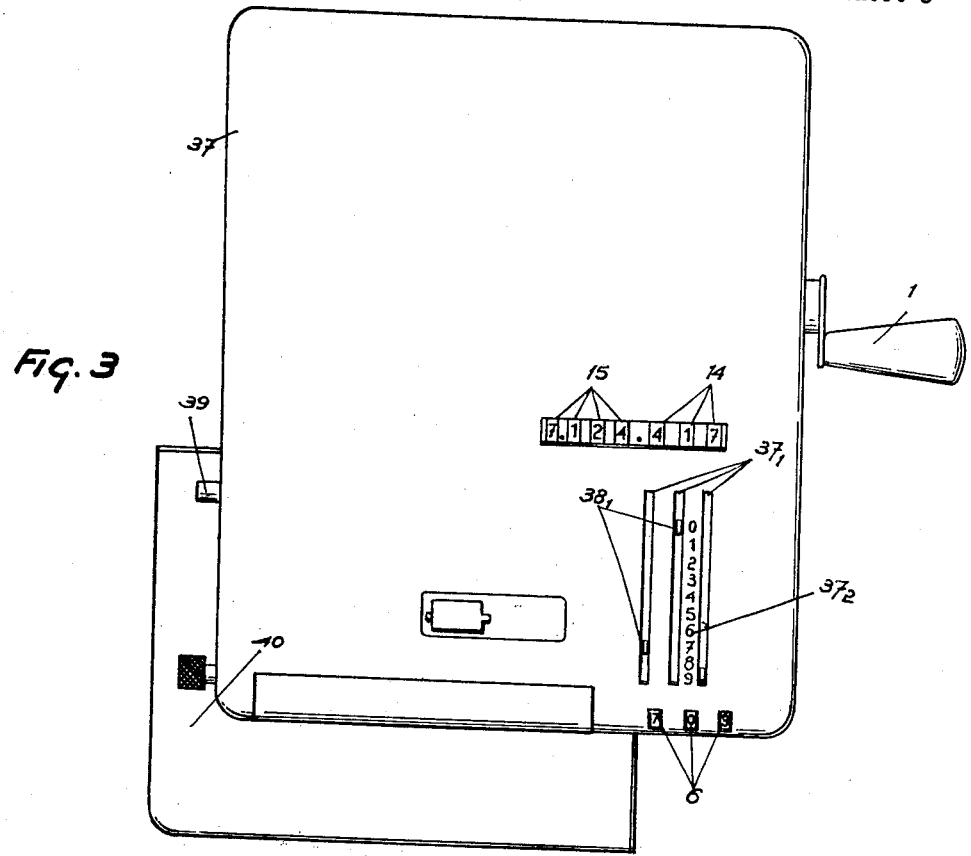
FIGURE 3 is an external top view of the machine shown in FIGURE 2.

The value selecting lever 38 (FIGURE 10) essentially comprises a spur $38_1$ (or pin) which projects out of the casing 37 of the machine through a slot $37_1$ (FIGURE 3) which enables the user, by acting on this pin, to displace the selection disk 38 at will, and hence, the embossed printing rollers 10. During revolution of the rotary head 5, the ends $38_1$ of the value-selection levers 38 clear the ends of the slots $37_1$ in the casing 37.

Figure 2:
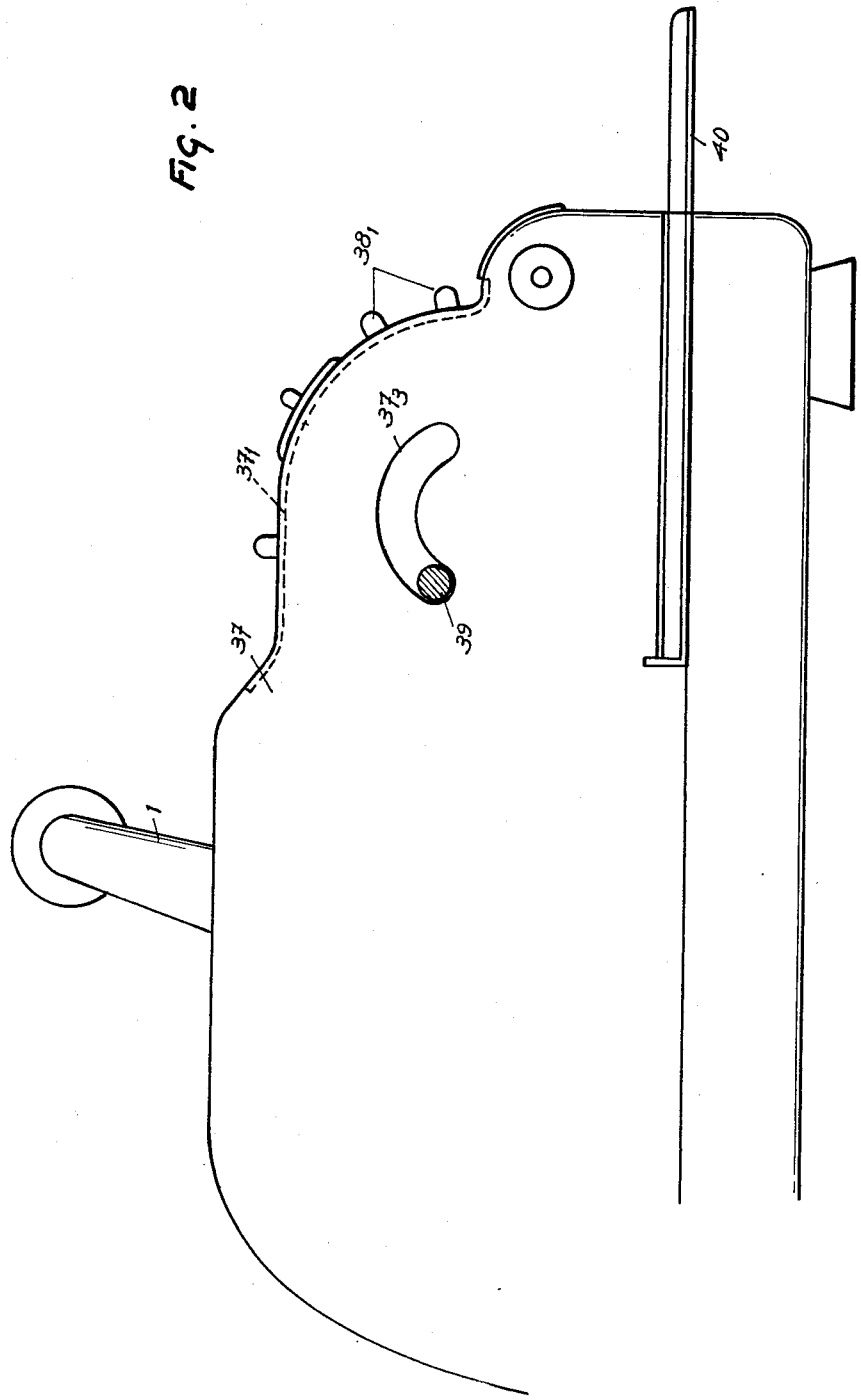
FIGURE 2 is an external side view of the machine.

The displacement of the pin $38_1$ (FIGURES 2 and 3) takes place preferably in front of guide marks $37_2$ made on the casing 37 of the machine and showing the position of the disk 38, and consequently, the position of the embossed printing rollers 10.

The value selecting disk 38 (FIGURE 10) comprises an arcuate groove $38_4$ made in two parts having different radii, the two parts of this groove being united by a transversal inclined groove portion.

Figure 10:
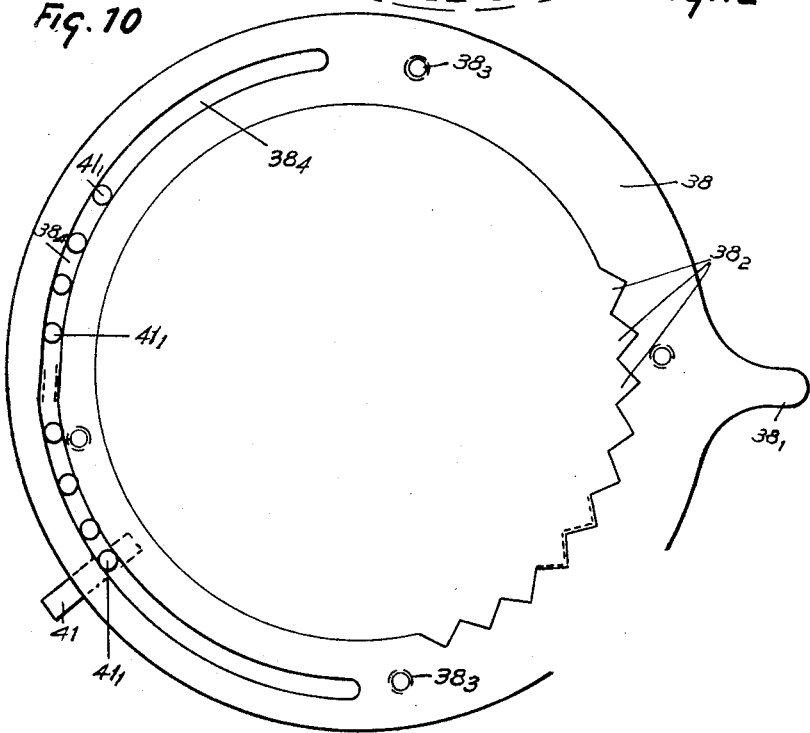
FIGURE 10 is a front view of a selection lever shown edgewise in FIGURE 7.

As shown in FIGURE 10, when the head $41_1$ of the tooth 41 is in the part of the groove $38_4$ possessing the smallest radius, the tooth is completely effaced inside the plate 12, whereas, when the lever 38 impels the head of the tooth 41 and brings the latter into the part of the groove with a larger radius the tooth 41 partially emerges from the plate 12.

The value selecting lever 38 (FIGURE 10) is provided on part of its internal periphery with V-shaped notches or clearances $38_2$ in one of which a spring biased needle (not shown) is engaged, said needle moving in a radial bore $12_3$ of the plate 12.

The purpose of the spring-biased detent is to hold the position of the selection lever 38 and prevent it from moving under the effect of an involutary movement on the part of the user.

The clearances $38_2$ are, however, so made as to enable the needle to pass easily from one to another of said clearances; they also correspond to the positions in which the control pin $38_1$ is found to be in alignment with the guide marks $37_2$ (FIGURE 3) provided on the casing 37.

The value selecting device also comprises a double toothed disk 7, which is made integral with the value selecting lever 38 by fixing means such as screws cooperating with the screw holes $7_4$ in the double toothed disk and with screw holes $38_3$ of the value selecting lever 38.

As shown in FIGURE 7, a ring 43 provided with holes $43_1$ is placed between the value selecting lever 38 and the double toothed disk 7, enabling the passage of the fixing means connecting the value selecting lever 38 with the double toothed disk 7.

When the user operates the pin $38_1$ (FIGURES 2, 3 and 10) of the value selecting lever 38, at the same time he moves the double toothed disk 7 and brings out a number of teeth 41 corresponding to the value that he wishes to have printed by each embossed printing roller.

The selecting of values thus has the purpose of bringing out a certain number of teeth 41 of the plate 12 and to carry forward the value selected on the printing device, i.e., on the embossed printing rollers 10, and when the machine is fitted with a position finder, on the serrated wheels 6 of the latter.

The rotation of the double-toothed disk 7 involves, by external teeth $7_b$ of the latter, the rotation of the serrated wheels 6 of the position finder and by its internal teeth $7_a$ the rotation of the pinions 11 integral with the embossed rollers 10 of the printing device.

In the form of embodiment shown, the value selecting devices (FIGURE 7) are three in number, i.e., allowing in a decimal system the obtaining of values from 0 to 999.

To each plate $12_1$, $12_2$, $12_3$ there corresponds a serrated wheel of the position finder $6_1$, $6_2$, $6_3$, an embossed roller $10_1$, $10_2$, $10_3$ of the printing device and a serrated wheel $14_1$, $14_2$, $14_3$ of the totalization device.

The liaison between each double toothed disk 7 and each pinion 11 integral with a roller 10 of the printing device is preferably effected by a set of pinions 8, 9 (FIGURE 1).

These sets of pinions 8, 9 are composed, in the example described and shown, by telescopic tubes $8_1$, $8_2$, $8_3$ and $9_1$, $9_2$, $9_3$, the end pinion $8_{3a}$ for example of the telescopic tube $8_3$ driving by the pinion $8_{3b}$ of its other end, the pinion $9_{3b}$ of the tube $9_3$, which, by the pinion $9_{3a}$ of its other end, drives the pinion $11_3$ integral with the embossed printing roller $10_3$. On the other hand, the teeth 41 of the plate 12 of the Ohdner disk mesh with the pinions 13 each integral with a serrated wheel 14 of the totalization unit.

In the illustrative embodiment of the invention as shown, the totalization unit comprises three serrated wheels $14_1$, $14_2$, $14_3$ whose rotation is directly transmitted by the rotation of the plates 12 of the selection device.

However, as shown in FIGURE 1, the totalization device also comprises serrated wheels 15 giving, in the decimal system, the totalization of thousands, tens of thousands, hundreds of thousands and millions. The carrying forward of the values of the unit serrated wheel $14_3$ to the serrated wheel of the tens $14_2$ and from the serrated wheel of the tens $14_2$ to the serrated wheel of the hundreds $14_1$ is effected in the known manner by means of a device called a "quadrant $17_1$, $17_2$," whereas the carrying forward of the hundreds serrated wheel $14_1$ to the serrated wheel of the thousands and from the serrated wheel of the thousands to the serrated wheel of the tens of thousands, etc.; is effected by differential pinions 16.

The device called a "quadrant" consists of a metal plate $17_1$, $17_2$ (see FIGURE 1) mounted on the totalizer spindle. One quadrant $17_1$ cooperates with the hundreds roller $14_1$, the other quadrant $17_2$ cooperates with the tens roller $14_2$. These quadrants are displaced in a manner known in the art by means of a catch or a cam at each revolution of the respective lower range roller, that is to say, that the quadrant $17_2$ is actuated by the units rollers $14_3$ of the totalizer, whereas the quadrant $17_1$ is actuated by the tens roller $14_2$. Thus, at each revolution of these rollers $14_2$, $14_3$ the quadrants approach the disks 12 of the selection levers corresponding to the tens or hundreds.

When the roller $14_3$ of the units has made one revolution, or rather when this roller after having recorded the numeral "9" passes again to the numeral "0," then a catch or cam displaces the quadrant $17_2$ so as to put it in the path that should be taken by the carrying-over finger 42 of the tens disk $12_2$.

The quadrant $17_2$ then displaces this finger 42 and places it in the plane of the teeth 41 of the tens disk $12_2$, thus in effect adding one more projecting tooth in the tens disk. The tens roller $14_2$ will thus totalize not only the figure of the tens selected by the disk $12_2$ but also the supplementary ten resulting from the carrying over of the figures of the units.

The same operation takes place between the tens rollers $14_2$ and the hundreds roller $14_1$ by means of the quadrant $17_1$.

Moreover, in addition to the embossed printing rollers 10 of the printing unit, the rotary head 5 comprises a dating device 34, whose serrated wheels can, for example, be positioned by a means such as a stylet.

Figure 16:
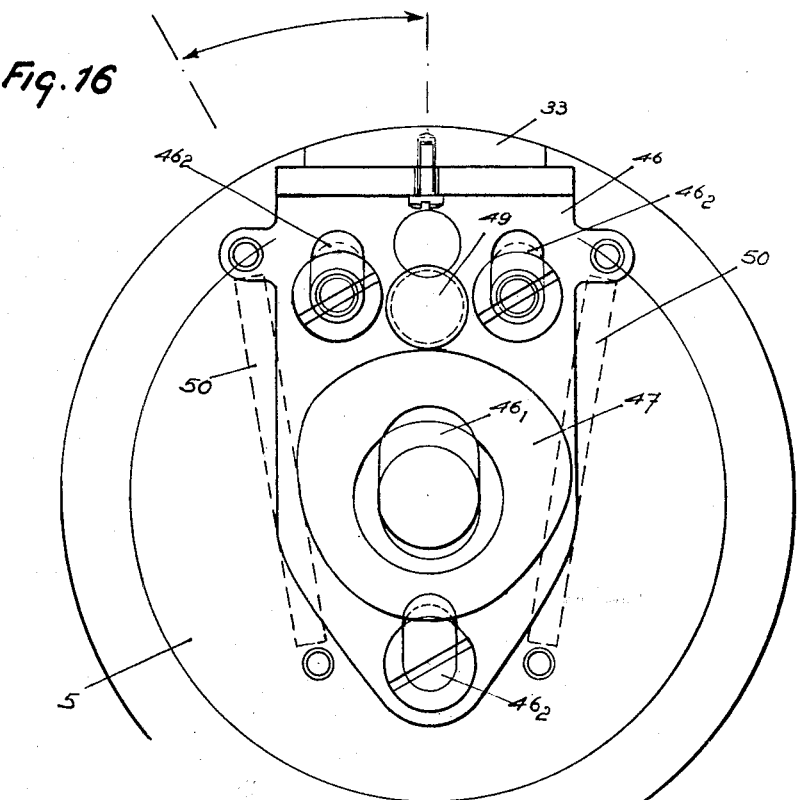
FIGURE 16 is a left-hand view of FIGURE 15.

Lastly, the rotary head 5 of the stamping machine is provided with a publicity unit 33 mounted in a removable manner on the rotary head by means of a device such as a support 46 (FIGURES 15 and 16). This support 46 is made in the form of an angle-iron and has elongated clearances $46_1$, $46_2$, enabling the displacement of said support 46 in relation to the rotary head 5.

The clearances $46_2$ act as housings for the devices fixing the support onto the rotary head 5.

On the other hand, the support 46 is provided with a roller 49 rolling on a cam 47, which is provided with an adjustment means enabling the user to place the publicity unit 33 either level with the embossed printing rollers 10 and the serrated wheels of the dating device 34, thus affording the common printing of these three devices, or at a level lower than the embossed printing rollers 10 and serrated wheels of the dating device 34, thus only effecting the printing of the values carried forward by the embossed printing rollers and the printing of the dating device 34.

The cam 47 is connected to a barrel 48 sliding on the part $4_2$ of the spindle 4 around which the rotary head 5 revolves, this barrel being connected by a lever to an operating knob (FIGURE 2) 39 moving in an arcuate opening $37_3$ formed in the casing 37 of the machine. The user, by operating the knob 39, determines the rotary position of the cam 47 and thus enables the displacement of the support 46 which tends to be withdrawn out of operation by the action of the springs 50, which tend to retract the publicity unit 33 below the level of the embossed printing rollers 10 and the serrated wheels of the dating device 34.

Figure 13:
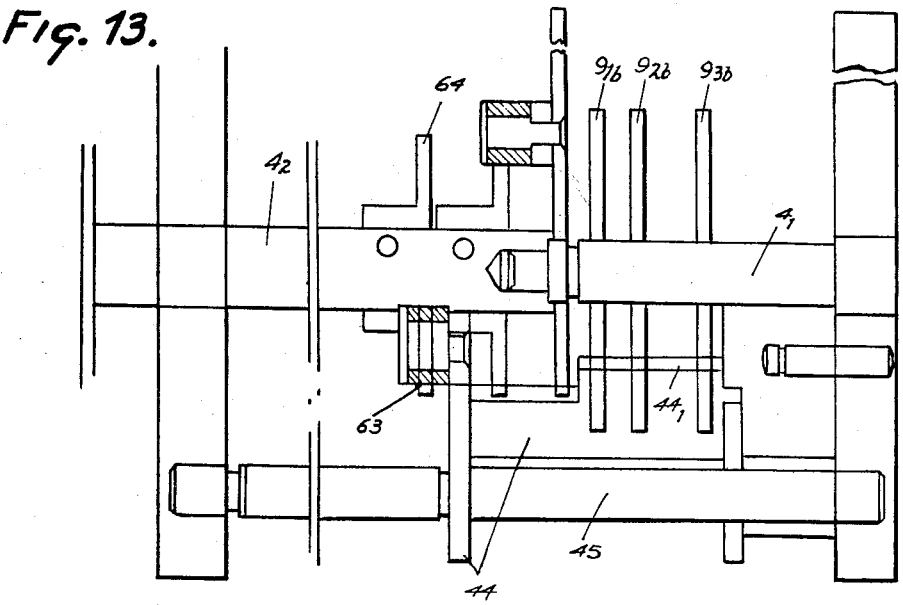
FIGURE 13 is a front view of the device for locking the embossed printing rollers.
Figure 14:
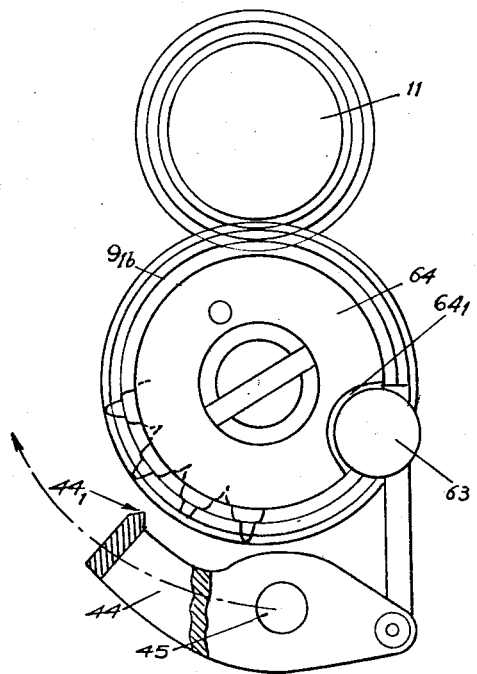
FIGURE 14 is a side view of the device of FIGURE 13.

The stamping machine according to the invention is also provided with a locking device (FIGURES 13 and 14) ensuring the maintaining of the rollers 10 of the printing device in the selection position effected by the user when actually printing the document 35 by said embossed printing rollers 10 (FIGURES 13 and 14).

This locking device essentially comprises a stirrup 44 whose longitudinal locking bar $44_1$ comes between the teeth of the pinions 9 of the set of pinions connecting the double toothed disks 7 to the respective pinions 11 integral with the embossed printing rollers 10.

The stirrup 44 is mounted in the rotary head 5 on a spindle parallel to the spindle $4_1$ of the rotary head 5.

On this spindle $4_1$ there is also mounted a cam 64 provided with a recess or clearance $64_1$, said cam enabling, in a given position, the engaging in the clearance $64_1$ of a roller 63 connected to the stirrup 44. The stirrup 44 is in constant unbalance, that is to say, the weight of the arm comprising the catch $44_1$ is greater than the weight of the arm comprising the roller 63. On this account, the catch $44_1$ constantly tends to come out of the teeth of the pinions 9 but this can only occur when the recess $64_1$ of the cam 64 is positioned adjacent to the roller 63, which actually corresponds to the inactive position of the stamping machine, i.e., corresponds to the value selection position. For every other position (during the rotation of the rotary head) the roller 63 abuts on the periphery of the cam 64 which thus keeps the catch $44_1$ in engagement with the teeth of the pinions 9 and prevents any alteration of the values to be printed during operation.

Figure 17:
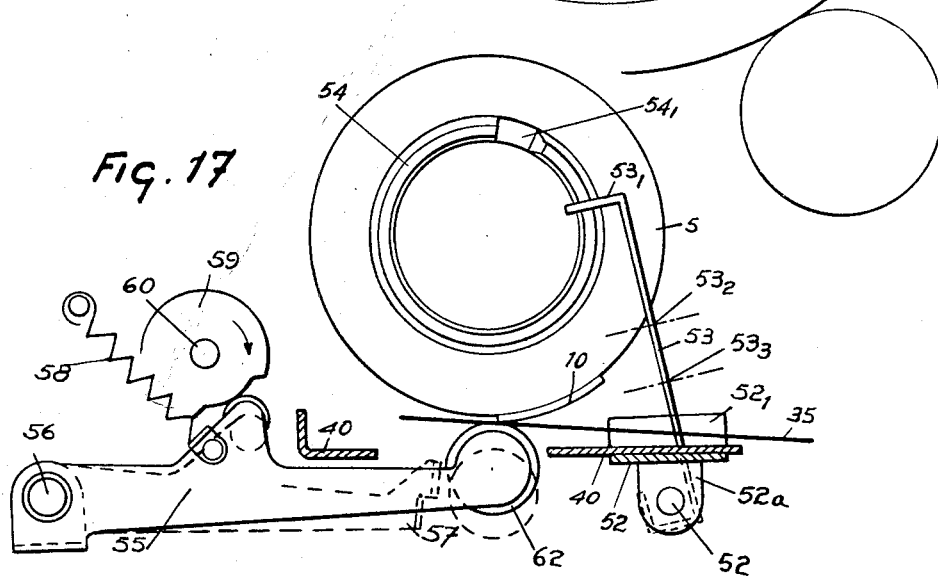
FIGURE 17 is a front view of the mounting of the pressure roller of the mobile abutment and the ejector of the machine.
Figure 18:
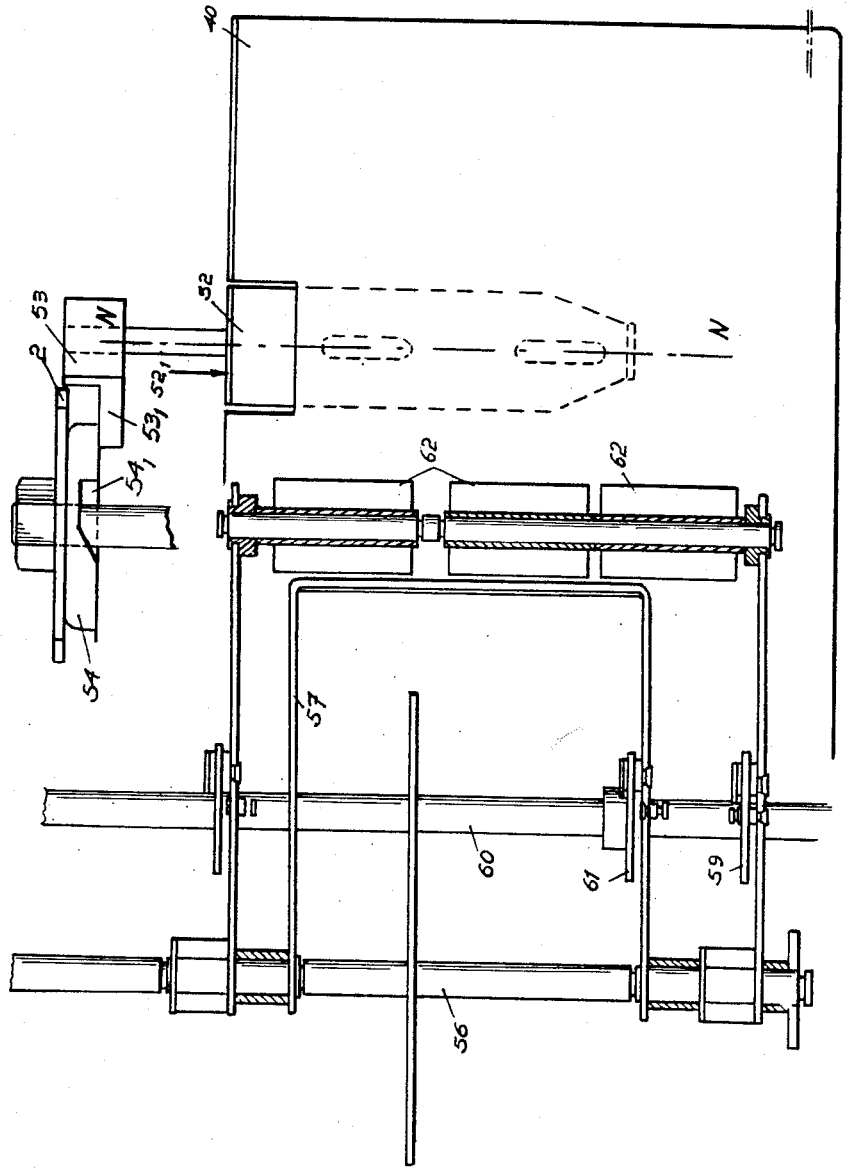
FIGURE 18 is a top view of FIGURE 17.

Lastly, the stamping machine is provided, as shown in FIGURES 17 and 18:

(a) With a device permitting the application of the document to be stamped 35 against the embossed printing rollers, the date-stamping device 34 and the publicity unit 33;

(b) With a device for ejecting the document after it has been printed;

(c) With an abutment which positions the document 35 before printing and which retracts when printing takes place.

The device permitting the application of the document 35 against the rollers 10, the serrated wheels of the dating device 34 and possibly the publicity unit 33, essentially comprises a pressure roller 62 (FIGURE 18) made in one or several parts, said pressure roller being mounted at the end of the levers 55 pivoting around a spindle 56.

These levers 55 cooperate by means such as rollers with cams 59 mounted on a cam shaft 60. These cams 59 are so shaped that the document 35 introduced on to the tray 40 of the stamping machine is raised by the pressure roller 62 at the moment when the printing devices come into cooperation with said document 35, thus applying this document against the printing devices.

When printing has been accomplished, the pressure roller 62, will, by means of cams 59, rollers and the levers 55, be thrust into a retracted position shown by a dotted line in FIGURE 17 then tightening a spring 58, which always tends to bring the pressure roller 62 to its high position.

The ejection device for the printed document, consists of a plate 52 provided with a flange $52_1$ forming the ejector itself. This plate is placed underneath the table 40 on which is received the document to be printed, and the flange $52_1$ projects above the upper face of this table. Thus, by actuating the ejector 52 by a sharp movement in the direction of N–N′, the document on the table 40 is ejected in a direction parallel to the axis of the rotary head.

This ejector 52 is connected with a shaft 52 as shown in FIGURE 17 by means of a tongue $52_a$, and the shaft $52_2$ is itself connected at its end to the bottom part of the lever 53. This lever 53 is articulated at $53_2$ and a spring (not shown) hooked at $53_3$ to this lever 53 constantly tends to attract the lower part of the lever 53 and thus the spindle $52_2$ and the ejector 52 in the direction N–N′.

The upper end of the lever 53 comprising an edge $53_1$ is mounted near to a cam 54 including a recess $54_1$. The spring hooked at $53_3$ on to the lever 53 thus tends constantly to press the flange $53_1$ against the cam 54.

During the rotation of the rotary head 5 and after the printing roller 10 has printed the document (see FIGURE 17), the upper flange $53_1$ of the lever 53 falls sharply into the recess $54_1$ of the cam 54, which has the effect of suddenly advancing the ejection plate 52 in the direction N–N′ and thus to eject the document on the table 40 in contact with the flange $52_1$.

This ejection thus takes place along a course perpendicular to the course according to which it had been introduced into the stamping machine.

The stamping machine also comprises a mobile abutment device determining the positioning of the document 35 on the tray 40 of the machine before the printing of said document, this mobile abutment 57 also cooperating, like the pressure device, with a cam 61 mounted on the cam shaft 60. The cam 61 is so made that the mobile abutment 57 retracts just before the cooperation of the printing devices with the document to be printed 35.

When printing, the rotary head 5 then conveys the document 35 along a course prolonging its course of introduction into the machine, this document 35 then abutting, after printing, against a rim of the tray 40 and the rotary head 5 while continuing its movement towards the cam 54 which control the ejection of said document.

SUCCESSIVE STEPS OF OPERATION IN A UTILIZATION CYCLE OF THE MACHINE

(I) Selection of values

The user positions the levers 38 according to the total value to be obtained.

This operation entails the exit of "n" teeth 41 from each plate 12 corresponding to the position of each value selection lever 38.

At the same time, this operation involves the rotation of the double toothed disk and consequently the putting into concordance with the selection device:

(a) Of the serrated wheels of the position finder 6,
(b) The embossed printing rollers 10.

(II) Introducing the document into the machine

The document stops against the mobile abutment 57. The pressure rollers are then in the bottom position.

(III) Action on the crank (1) The feeler comes into contact with the document and releases the locking device of the crank, thus enabling the drive by the latter of the rotary head 5.

(2) The embossed printing rollers are then held motionless with respect to the rotary head 5 in their previously prepared positions and their locking owing to their liaison with the selection levers also renders the latter motionless.

(3) The rotary head continuing its movement, the teeth 41 of each Ohdner disk drive the corresponding pinions 13 of the totalizator. The value to be stamped is thus carried on to the totalizator before the stamping of the document.

(4) The printing devices run over an inking roller, as the rotary head 5 continues its movement.

(5) The mobile abutment 57 retracts.

(6) The pressure roller rises and puts the document into contact with the printing devices.

(7) Printing:

Of the value carried by the embossed printing rollers;
Of the plate of the dating device;
Possibly, of the publicity unit.

The rotary head by continuing its movement causes the displacement of the document by the printing devices.

(8) The pressure roller retracts.

(IV) Ejection

The rotary head continuing its movement, the ejection device driven by the cam 54 sends the document along a course perpendicular to its entry course into the machine.

The rotary head still continuing its movement, involves the following displacements:

Rising again of the mobile abutment,
Recocking the ejector,
Its self-locking owing to the fact that there is no longer a document on the tray of the machine.

What I claim is:

1. A stamping machine comprising a rotatable head mounted in the machine for the rotation of said head about its axis, a plurality of rotatable printing wheels mounted in said rotatable head, said printing wheels having axes of rotation parallel to the axis of said rotatable head, a plurality of rotatable value-selection devices for selection of values for the printing wheels, said value-selection devices being mounted coaxially to the axis of the rotatable head, a plurality of trains of rotatable pinions mounted in said rotatable head, said trains of pinions having axes parallel to the axis of said rotatable head, each said train of pinions establishing a positive constant mechanical drive relationship between a respective one of said value-selection devices and one of said printing wheels, a totalizing assembly mounted in the machine outside of the rotatable head and comprising a plurality of counting wheels mounted on axes parallel to the axis of the rotatable head, these counting wheels being in constant mechanical drive relationship with the value-selection devices, and a locking device for printing wheels, said locking device being located inside of said rotatable head and comprising a stirrup rockably mounted in the rotatable head on a spindle extending parallel to the axis of said rotary head, and means for engaging said stirrup with the pinions of said trains for locking the printing wheels against rotation during the rotation of said rotatable head, said printing wheels projecting slightly beyond the perimeter of said rotatable head for printing a document adjacent to said head during rotation of said head.

2. A stamping machine as claimed in claim 1 wherein said rotatable head is positioned in an inactive position when said value-selection devices are being operated and said means for engaging said stirrup with said pinions includes an actuating roller connected to said stirrup, and a fixed cam mounted coaxial with the axis of said rotatable head and having a recess therein, said roller being in engagement with said cam during rotation of said head for holding said stirrup in locking engagement with said pinions and said roller entering said recess when said head is in its inactive position for releasing said stirrup from said pinions for releasing the trains of pinions for rotation in said head.

3. A stamping machine as claimed in claim 1 and including a shaft mounted outside of the rotatable head and extending parallel with the axis of said rotatable head, a lever pivotally mounted on said shaft, a pressure roller extending parallel with said axis and being supported on said lever for movement toward and away from said rotary head, spring means connected to said lever for urging said pressure roller toward said head for applying a document to be printed against said printing wheels, and rotatable cam means for moving said lever away from said head after the document has been printed.

4. A stamping machine for stamping documents, and the like inserted therein comprising a rotatable head mounted in the machine for the rotation of said head about a main axis, a plurality of rotatable printing wheels mounted in said rotatable head, said printing wheels having axes of rotation parallel to said main axis, a plurality of value-selection devices rotatably mounted in said head for selection of values for the printing wheels, said value-selection devices being mounted coaxially to said main axis, a plurality of trains of rotatable pinions mounted in said rotatable head, said trains of pinions having axes parallel to said main axis, each said train of opinions establishing a positive constant mechanical drive relationship between a respective one of said value-selection devices and a respective one of said printing wheels, a totalizing assembly mounted in the machine outside of the rotatable head and comprising a plurality of counting wheels mounted on axes parallel to the axis of the rotatable head, said counting wheels being in constant mechanical drive relationship with said value-selection devices, a locking device for the printing wheels located inside of said rotatable head and comprising a stirrup rockably mounted in the rotatable head on a spindle extending parallel to said main axis and means for engaging said stirrup with the pinions of said trains for locking the printing wheels and value selection devices against rotation during the rotation of said rotatable head, a support retractably mounted in said head, a publicity printing block on said support on the same side of said head as said printing wheels, said support having a roller secured thereto, a control cam engaging said roller for extending and retracting said publicity block during rotation of said head, and a mounting for said cam for holding said cam aligned with said main axis.

5. A stamping machine as claimed in claim 4 and wherein said mounting for the publicity block control cam includes a tubular barrel surrounding the main axis and adjustable about said main axis, and a lever secured to said barrel for adjusting the position of said cam.

6. A stamping machine for stamping documents, and the like, inserted therein comprising a tray for receiving the documents thereon, a rotatable head including a main spindle mounted in the machine for the rotation of said head about said main spindle, a plurality of rotatable printing wheels mounted in said rotatable head, said printing wheels having axes of rotation parallel to said main spindle, a plurality of value-selection devices rotatably mounted in said head for selection of values for the printing wheels, said value-selection devices being mounted coaxially to said main spindle, a plurality of trains of rotatable pinions mounted in said rotatable head, said trains of pinions having axes parallel to said main spindle, each said train of pinions establishing a positive constant mechanical drive relationship between a respective one of said value-selection devices and a respective one of said printing wheels, a totalizing assembly mounted in the machine outside of the rotatable head and comprising a plurality of counting wheels mounted on axes parallel to the main spindle of the rotatable head, said counting wheels being in constant mechanical drive relationship with said value-selection devices, a locking device for the printing wheels located inside of said rotatable head and comprising a stirrup rockably mounted in the rotatable head on a spindle extending parallel to said main spindle and means for engaging said stirrup with the pinions of said trains for locking the printing wheels and value-selection devices against rotation during the rotation of said rotatable head, a pressure roller outside of said rotatable head and adjacent to said tray, means for actuating said roller for applying the document to be printed against said printing wheels, and a shaft outside of said head and beneath said tray, and a stirrup movably mounted on said shaft for positioning documents on the tray to be printed.

7. A stamping machine as claimed in claim 6 and wherein said stamping machine includes an automatic ejection device for ejecting the documents following printing comprising a cam mounted on the main spindle of the rotatable head including an abrupt recess therein at a predetermined position, an ejection element adjacent to said tray, and a lever connected to said ejection element and engaging said cam for ejecting the document when said lever moves abruptly into said recess.

8. A stamping machine as claimed in claim 6 and including a hand crank having a shaft connected to the main spindle for rotating said rotatable head, and a locking device for preventing the hand crank from operating the machine in the absence of a document on the tray comprising first and second cams mounted on the spindle of the hand crank, a stop lever for engaging said first cam, a rocking lever engaging said second cam, a feeler element connected to said rocking lever and operated thereby for sensing the presence of a document on said tray, and a linkage connecting said stop lever and said rocking lever for withholding said stop lever from said first cam in the presence of a document and for releasing said stop lever into engagement with said first cam in the absence of a document.

9. A stamping machine comprising a rotatable head mounted in the machine for the rotation of said head about its axis, a plurality of rotatable printing wheels mounted in said rotatable head, said printing wheels having axes of rotation parallel to the axis of said rotatable head, a plurality of rotatable value-selection devices for selection of values for the printing wheels, said value-selection devices being mounted coaxially to the axis of the rotatable head, a plurality of trains of rotatable pinions mounted in said rotatable head, said trains of pinions having axes parallel to the axis of said rotatable head, each said train of pinions establishing a positive constant mechanical drive relationship between a respective one of said value-selection devices and one of said printing wheels, and a locking device for the printing wheels, said locking device being located inside of said rotatable head and comprising a stirrup rockably mounted in the rotatable head on a spindle extending parallel to the axis of said rotary head, and means for engaging said stirrup with the pinions of said trains for locking the printing wheels against rotation during the rotation of said rotatable head, said printing wheels projecting slightly beyond the perimeter of said rotatable head for printing a document adjacent to said head during rotation of said head.

References Cited by the Examiner

UNITED STATES PATENTS

| | | | |
|---|---|---|---|
| 618,158 | 1/99 | Wolf | 235—101 |
| 1,308,510 | 7/19 | Rudin | 235—81.50 |
| 1,761,557 | 6/30 | Block | 235—130 |
| 1,786,454 | 12/30 | Robertson | 235—130 |
| 2,237,446 | 4/41 | Nilsson | 235—101 |
| 2,869,783 | 1/59 | Barberis | 235—3 |

FOREIGN PATENTS

| | | |
|---|---|---|
| 700,777 | 1/31 | France. |
| 865,914 | 2/53 | Germany. |
| 265,178 | 5/27 | Great Britain. |
| 384,232 | 12/32 | Great Britain. |
| 464,132 | 4/37 | Great Britain. |
| 464,133 | 4/37 | Great Britain. |
| 80,535 | 5/34 | Sweden. |
| 105,049 | 7/42 | Sweden. |

LEO SMILOW, *Primary Examiner.*

A. BERLIN, *Examiner.*